United States Patent [19]

Gunjima et al.

[11] 4,225,400

[45] Sep. 30, 1980

[54] METHOD OF BONDING CATION EXCHANGE MEMBRANE OF FLUORINATED POLYMER

[75] Inventors: Tomoki Gunjima; Isamu Takeshita, both of Yokohama, Japan

[73] Assignee: Asahi Glass Company, Limited, Tokyo, Japan

[21] Appl. No.: 15,917

[22] Filed: Feb. 28, 1979

Related U.S. Application Data

[62] Division of Ser. No. 907,202, May 18, 1978.

[30] Foreign Application Priority Data

May 24, 1977 [JP] Japan ................................. 52-59345

[51] Int. Cl.$^2$ .......................... C25B 1/34; C25B 13/08
[52] U.S. Cl. ................................. 204/98; 204/128; 204/296
[58] Field of Search .................... 204/296, 98, 128

[56] References Cited

U.S. PATENT DOCUMENTS

| | | | |
|---|---|---|---|
| 4,100,113 | 7/1978 | McCain | 204/296 |
| 4,115,240 | 9/1978 | Asawa et al. | 204/296 |
| 4,156,639 | 5/1979 | Vallance et al. | 204/296 |

*Primary Examiner*—R. L. Andrews
*Attorney, Agent, or Firm*—Oblon, Fisher, Spivak, McClelland & Maier

[57] ABSTRACT

A method of bonding a cation exchange membrane which comprises melt-bonding a part of the cation exchange membrane of a fluorinated copolymer in the form having ion-exchange groups of —COOY wherein Y represents hydrogen atom or a $C_1$–$C_{20}$ alkyl group, when the cation exchange membrane is used in the form having ion-exchange groups of $$-(COO)_m X$$

wherein X represents an alkali metal, an alkaline earth metal or —$NHR_1R_2R_3$ and $R_1$ to $R_3$ respectively represent hydrogen atom or a lower alkyl group and m is a valence of X.

9 Claims, No Drawings

METHOD OF BONDING CATION EXCHANGE MEMBRANE OF FLUORINATED POLYMER

This is a division, of application Ser. No. 907,202 filed May 18, 1978.

BACKGROUND OF THE INVENTION

Field of the Invention

The present invention relates to a novel method of bonding a cation exchange membrane of a fluorinated polymer. More particularly, it relates to a novel method of bonding a cation exchange membrane of a fluorinated polymer for an electrolysis which is used for an electrolysis of an aqueous solution of an alkali metal chloride to produce chlorine and an alkali metal hydroxide.

Description of the Prior Art

It has been known to produce chlorine in an anode compartment and alkali metal hydroxide in a cathode compartment by partitioning the anode compartment and the cathode compartment with a diaphragm and feeding an aqueous solution of an alkali metal chloride into the anode compartment to electrolyze it. The method has been known as a two-compartment type diaphragm electrolysis.

Thus, it has been proposed to use a cation exchange membrane of fluorinated polymer which does not substantially pass the electrolyte and selectively pass only alkali metal ions and has high alkali resistance and chlorine resistance, to produce an alkali metal hydroxide which does not substantially contain an alkali metal chloride as the ion exchange membrane electrolysis.

It has been found that the cation exchange membranes of the carboxylic acid type fluorinated polymer are superior to cation exchange membranes of the sulfonic acid type fluorinated polymer in the electrolytic characteristics.

Thus, an alkali metal hydroxide having a high concentration such 25 to 45 wt.% can be produced at higher than 90% of a current efficiency by using the cation exchange membrane of the carboxylic acid type fluorinated polymer, and the membrane has rather less electric resistance in comparison with the cation exchange membrane of the sulfonic acid type fluorinated polymer.

It is often necessary, for some applications, to bond such cation exchange membranes either to themselves or to other resins.

For example, it is necessary to bond the cation exchange membrane for repairing the membrane, when pin-holes, peelings or breaking at a part of the membrane is caused. It is also necessary to bond the membranes to form a specific shape such a bag shape by bonding two or more membranes or to fix the membrane on the other synthetic resin in one piece.

In the bonding operation, it is necessary to melt the membrane enough to give a viscosity required for bonding the membrane at the bonding part, except using adhesives.

The inventors have studied to bond the cation exchange membrane of the carboxylic acid type fluorinated polymer and have found the following fact. The melting properties of the membrane are significantly different depending upon the kind of the carboxylic acid type ion exchange groups of the membrane.

It is known that membranes containing carboxylic ion exchange groups, such as the membranes employed in the electrolysis of aqueous alkali metal halides, readily decompose at low temperatures, i.e., either at or below their melting point. Thus, it has not been possible to melt bond such membranes.

When the ion exchange groups of the membrane are in the form of $-(COO)_mX$ wherein X represents an alkali metal or an alkaline earth metal or $HNR_1R_2R_3$ and $R_1$ to $R_3$ represent hydrogen or a lower alkyl group and m is a valence of X, the membrane is decomposed before or during melting it whereby it is impossible to bond the membrane.

SUMMARY OF THE INVENTION

It is an object of the present invention to provide a method of bonding a cation exchange membrane of a fluorinated polymer having ion exchange groups having the formula in its used state.

$$-(COO)_mX$$

wherein X represents an alkali metal, an alkaline earth metal or $HNR_1R_2R_3$ and $R_1$ to $R_3$ respectively represent hydrogen atom or a lower alkyl group and m is a valence of X.

It is another object of the present invention to bond the cation exchange membrane having the carboxylic acid type fluorinated polymer without using an adhesive composition, whereby the pin-holes, peeling or breaking of the membrane can be easily repaired and two or more membranes can be easily bonded and the membrane can be bonded on the other synthetic resin and the homogeneous property of the cation exchange membrane can be maintained to give preferable condition because of using no adhesive heterogeneous material and the membrane can be bonded at considerably lower temperature than the decomposition temperature of the polymer of the membrane so that the decomposition of the membrane is not substantially caused even though a local heating for bonding is given to cause non-uniform temperature and a deterioration of the polymer is not substantially caused even though a fatigued membrane is bonded.

The foregoing objects of the present invention have been attained by melt-bonding (welding) the bonding part of the membrane of which the ion exchange groups are in the state of $-COOY$ wherein Y represents hydrogen atom or a $C_1$-$C_{20}$ alkyl group whereby the fluorinated polymer of the membrane is melted to give a viscosity required for bonding without decomposing and having various undesirable influence on the fluorinated polymer.

DETAILED DESCRIPTION OF THE PREFERRED EMBODIMENTS:

The cation exchange membrane of the carboxylic acid type fluorinated polymer which can be bonded by the method of the present invention should have ion exchange groups of $-(COO)_mX$; wherein X and m are defined above; in an electrolysis of an aqueous solution of an alkali metal chloride. It is preferable that X is the same with the alkali metal of the alkali metal chloride in the electrolysis.

The ion exchange capacity of the cation exchange membrane is important because it relates to the electrochemical properties of the membrane in the electrolysis. Suitable ion exchange capacity is depending upon a kind of the fluorinated polymer and is preferably in a range of 0.5 to 2.5 meq/g polymer, especially in a range of 1.0 to 1.8 meq/g polymer from the viewpoints of the electrochemical and mechanical characteristics of the membrane.

The cation exchange membranes of the fluorinated polymer can be fabricated by using various fluorinated copolymers. It is especially preferable to use copolymers produced by copolymerizing fluorinated olefin monomer and a comonomer having a functional group of $-(COO)_mX$ or a group which can be converted to $-(COO)_mX$ (hereinafter referring to as carboxylic acid type functional group).

The fluorinated olefin monomers having the carboxylic acid type functional group can be selected as desired and especially can be selected respectively to form the units of (a) $-(CF_2-CXX')-$ and (b) $-(CF_2-CX)-$
         $\;\;\;\;\;\;\;\;\;|$
         $\;\;\;\;\;\;\;\;\;Y$ wherein X represents fluorine, chlorine, hydrogen or $-CF_3$; X' represents X or $CF_3(CF_2)_m$;
m represents 1 to 5; and Y represents $-PA$ or $-O-(CF_2)_n(P,Q,R)-A$,
wherein P represents $-(CF_2)_a-(CXX)_b-(CF_2)_c$
Q represents $-(CF_2-O-CXX')_d$;
R represents $-(CXX'-O-CF_2)_e$;
P, Q and R are arranged in optional order;
X and X' are the same as defined above;
n represents 0 or 1;
a, b, c, d and e respectively represent 0 to 6;
A represents a functional group which can be converted to $-(COO)_mX$ in the electrolysis.

Suitable groups of Y include $-(CF_2)_x A, \;\; -O-(CF_2)_x A, \;\; -O-CF_2-CF_y A,$
$\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;|$
$\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;Z$ $-O-CF_2-CF_x-O-CF_2-CF_y A$
$\;\;\;\;\;\;\;\;\;|\;\;\;\;\;\;\;\;\;\;\;\;\;\;\;\;\;\;\;\;\;\;\;\;\;\;\;\;\;\;\;|$
$\;\;\;\;\;\;\;\;\;Z\;\;\;\;\;\;\;\;\;\;\;\;\;\;\;\;\;\;\;\;\;\;\;\;\;\;\;\;\;\;\;R_f$ $-O-CF_2-CF-O-CF_2-_x(CF_2)_y-CF_2-O-CF_z A$
$\;\;\;\;\;\;\;\;\;\;\;\;\;\;|\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;|$
$\;\;\;\;\;\;\;\;\;\;\;\;\;\;Z\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;\;R_f$ wherein x, y and z respectively represent 1 to 10 and Z and $R_f$ represent respectively $-F$ or a $C_1$-$C_{10}$ perfluoroalkyl group;
A is defined above. In the groups of Y, A is preferably bonded to a fluorinated carbon group.

The copolymers having the units of (a) and (b) preferably comprises 1 to 40 mole %, especially 3 to 25 mole % of the units of (b) so as to give the above-mentioned range of the ion exchange capacity of the membrane.

The molecular weight of the fluorinated polymer for the cation exchange membrane of the present invention is important as it concerns with the mechanical and electrochemical characteristics of the membrane. When the molecular weight is shown by the temperature $(T_Q)$ to give a volumetric melt flow rate of 100 m$^3$/sec. which is below defined, it is preferable to have high molecular weight enough to give $T_Q$ of 130° to 350° C., especially 180° to 300° C.

In the preparation of the copolymers, it can be modified by using two or more monomers of said each monomer unit or adding a third monomer. For example, the flexibility is imparted by combining $CF_2=CFOR_f$ wherein $R_f$ represents a $C_1$-$C_{10}$ perfluoroalkyl group. For example improved mechanical strength can be imparted by crosslinking the copolymer by combining a divinyl monomer such as $CF_2=CF-CF=CF_2$,
$CF_2=CFO(CF_2)_{1-4}OCF=CF_2$.

The copolymerization of the fluorinated olefin with the comonomer having the carboxylic acid type functional group or the third monomer, can be carried out by suitable conventional methods.

The copolymerization can be carried out by a catalytic polymerization, a thermal polymerization or a radiation-induced polymerization, by using a solvent such as halogenated hydrocarbons, if necessary.

The cation exchange membrane of the fluorinated polymer can be prepared by the conventional process for fabricating a membrane such as a press-molding method, a roll-molding method, an extrusion method, a solution spreading method, a dispersion molding method and a powder molding method, to give a thickness of 20 to 600μ preferably 50 to 400μ.

The cation exchange membrane of the fluorinated polymer can be produced by blending a polymer of olefin such as polyethylene polyporpylene preferably, polytetrafluoroethylene or a fluorinated copolymer of ethylene and tetrafluoroethylene to the carboxylic acid type fluorinated polymer in the step of fabrication of the membrane. It is also possible to reinforce the cation exchange membrane with a supporter of a fabric such as a cloth and a net; a nonwoven fabric or a porous film which is made of said polymer.

When the cation exchange membrane is reinforced by incorporating fibrils of polytetraluforoethylene, a reinforced membrane having excellent characteristics can be obtained.

When 0.5 to 4.0 wt. percents, preferably 1.0-2.8 wt. percents of fibrils of polytetrafluoroethylene are incorporated to the total of the fibrils and the cation exchange resin made of the fluorinated polymer for a cation exchange membrane, the resulting membrane has excellent tear strength, flexural strength and wearing resistance whereby the formation of creases and pinholes in the electrolysis can be considerably prevented and has excellent electric characteristics.

In the method, it is preferable to incorporated fine powder obtained by an emulsion polymerization of tetrafluoroethylene which has a specific surface area of 3 to 30 m$^2$/g into the cation exchange resin and preferably to apply shear stress of higher than 10$^5$ dyn/cm and especially to knead them at higher than 70° C. and lower than the melting point of the polytetrafluoroethylene whereby a reinforced membrane can be obtained.

The weight of the blended polymer and the reinforcing material of the polymer is not calculated for the ion exchange capacity.

The cation exchange membrane of the fluorinated polymer can be bonded as follows.

The ion exchange groups $-(COO)_mX$ of the cation exchange membrane of the fluorinated polymer in an electrolysis must be in the state of the groups $-COOY$ wherein Y is defined above.

Thus, if the ion exchange groups of the cation exchange membrane are $-(COO)_mX$, the ion exchange groups are converted to $-COOY$.

The conversion of the ion exchange groups can be performed by suitable method depending upon the kind of X and Y.

For example, when the groups are converted to groups $-COOH$ as Y=H, the membrane is contacted with an aqueous solution of an mineral acid or an organic acid preferably in the presence of a polar organic solvent.

Suitable mineral acids include hydrochloric acid, sulfuric acid, nitric acid and phosphoric acid.

Suitable organic acids include acetic acid, propionic acid, perfluoroacetic acid and p-toluenesulfonic acid.

It is preferable to use the acid as an aqueous solution of the acid having a concentration of 0.5 to 90 wt.%.

Suitable polar organic solvents include methanol, ethanol, butanol, ethyleneglycol, dimethylsulfoxide, acetic acid and phenol.

The polar organic solvent can be preferably added to the aqueous solution at a concentration of 5 to 90 wt.%.

The treatment of the membrane with an aqueous solution of the acid is preferably carried out at 10° to 120° C. for 30 minutes to 20 hours.

When the ion exchange groups are converted to the groups —COOY wherein Y is a $C_1$–$C_{20}$ alkyl group, the membrane is modified to the acid type by said method and then, the carboxylic acid groups are converted to ester groups by reacting the corresponding alcohol, or the carboxylic acid groups are converted to acid halide groups by reacting phosphorus trichloride or phosphorus oxychloride and then, converted to the ester groups by reacting the corresponding alcohol, or the carboxylic acid groups are converted to acid anhydride groups by reacting acetic anhydride or perfluoroacetic anhydride and then converted to the ester groups by reacting the corresponding alcohol.

The ion exchange groups —$(COO)_m X$ can be also converted directly to the acid anhydride group by contacting the membrane with an agent such as thionyl chloride, phosphorus trichloride at 0° to 120° C. for 1 to 25 hours and then, the groups are converted to the ester groups by reacting the corresponding alcohol.

The ion exchange group —$(COO)_m X$ can be also converted to groups —COOX by treating the membrane with the corresponding alcohol in the presence of a small amount of a mineral acid or an organic acid.

The alcohols used for converting the acid halide or acid anhydride groups to the ester groups include $C_1$–$C_{20}$ alcohols such as methanol, ethanol, propanol, butanol, dodecyl alcohol and sebacyl alcohol.

The esterification is preferably carried out after immersing the membrane into an aqueous solution of a mineral acid or an organic acid which can be the same or different acid used in the conversion of the groups —$(COO)_m X$ to the acid groups.

The immersing treatment is preferably carried out at 30° to 120° C. for 30 minutes to 40 hours.

When the cation exchange membrane of the fluorinated polymer is prepared to have ion exchange groups being in the form of —COOY, it is unnecessary to carry out the conversion described above.

The cation exchange membrane of the fluorinated polymer having the ion exchange groups —COOY can be easily melt-bonded (welded) without decomposing and having various undesirable influence on the fluoropolymer.

In order to bond the membrane, it is important to give suitable viscosity required in the molten condition over the simply melting of the membrane.

According to the studies of the inventors, it has been found that the melt viscosity is preferably in a range of $10^2$ to $10^6$ poise especially $10^3$ to $10^5$ poise to bond the membrane.

It is necessary to melt the bonding part of the membrane in the conditions (melt temperature and pressure, etc.) so as to impart the melt viscosity described above.

The temperature and the pressure for imparting the specific bonding strength have mutual relationship. When the pressure is higher, the temperature can be lower whereas when the pressure is lower, the temperature should be higher.

In many cases for bonding the membrane, it is not easy to apply high pressure to the bonding part in the bonding of the cation exchange membrane especially ones having a curved shape or a complicated shape. However, when the ion exchange groups of the membrane are converted to the groups —COOY in accordance with the method of the present invention, the decomposition temperature (the temperature for reducing 5% of weight of the polymer under raising the temperature at a rate of 10° C./min. in nitrogen atmosphere) is relatively high such as 350° to 370° C. in comparison with the temperature required to bond described below whereby the decomposition of the fluorinated polymer of the membrane does not cause in the bonding of the membrane.

Thus, the bonding part of the cation exchange membrane of the modified fluorinated polymer is heated preferably at 100° to 330° C. especially 130° to 300° C. It is enough to apply the pressure of 0.01 to 100 Kg/cm², especially 1–50 Kg/cm² to the bonding part.

The bonding can be carried out by a press heating method, an ultrasonic heating method, an impulse heating method, a frictional heating method and so on. In the case of the groups —COOH, a high frequency induction heating method can be applied. When a bag form is formed by the bonding, the ultrasonic heating method, the impulse heating method or the high frequency induction heating method are especially employed.

In order to improve the bonding of the membrane, the bonding surface can be pretreated. The pretreated can be a sand blast treatment or a coating of a swelling agent or a solvent for the COOY type polymer on the bonding surface.

The condition of the bonding is depending upon the bonding method, the kind of the fluorinated polymer of the membrane and the thickness of the membrane.

The impulse heating method is carried out at 160° to 350° C. under the pressure of 0.01 to 20 Kg/cm² for 1 sec. to 5 min.

The bonding of the cation exchange membrane of the fluorinated polymer is carried out as described above, in the cases of the repairing of pin-holes, peeling or breaking caused in the use, transportation, storage and handling of the membrane; and the preparation of large bonded membrane or bag type membrane by mutual bonding of the membranes and the melt bonding of the membrane on the other synthetic resin into one piece.

The bonding of the membrane is not restricted to the cases described above.

The other synthetic resins used for bonding the membrane are preferably the resins which are melted in the condition of melting the membrane of the present invention and are miscible in molten condition such as a copolymer of $CF_2=CF_2$ and

which has an ion exchange capacity of 0.8 to 0.95 meq/g polymer.

A further understanding can be obtained by reference to certain specific examples which are provided herein for purposes of illustration only and are not intended to be limiting unless otherwise specified.

In the examples, a volumetric melt flow rate is defined as follows.

A 1 g of a sample of the copolymer having ion exchange groups in the form of —COOCH$_3$ is extruded through a nozzle having a diameter of 1 mm and a length of 2 mm under a predetermined pressure of 30 Kg/cm$^2$ at a predetermined temperature. The volumetric melt flow rate is shown by the amount of polymer flowed in the unit of mm$^3$/sec.

An ion exchange capacity of a cation exchange membrane was measured as follows.

A H-type cation exchange membrane was immersed into 1 N-HCl at 60° C. for 5 hours to competely convert it to H-type membrane, and then the membrane was washed with water so as to be free of HCl. Then, 0.5 g of the H-type membrane was immersed into a solution prepared by adding 25 ml of water to 25 ml of 0.1 N-NaOH.

Then the membrane was taken out and the amount of NaOH in the solution was measured by a back titration with 0.1 N-HCl.

EXAMPLE 1

A cation exchange membrane of a fluorinated polymer having the units of

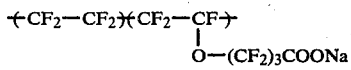

which had an ion exchange capacity of 1.50 meq/g polymer and a thickness of 200μ, was used.

Two compartment type electrolytic cell was assembled by partitioning an anolyte and a catholyte with the cation exchange membrane and using an anode of titanium coated with rhodium and a cathode made of stainless steel with a space of the electrodes of 1.2 cm and an effective area of 25 cm$^2$. The electrolysis of sodium chloride was carried out under the following conditions.

The anode compartment was filled with 4 N-NaCl aqueous solution and the cathode compartment was filled with 12 N-NaOH aqueous solution. The electrolysis was carried out by feeding 4 N-NaCl aqueous solution at a rate of 150 cc/hour into an anode compartment and feeding water into a cathode compartment so as to result 14.4 N-NaOH aqueous solution with a current density of 20 A/dm$^2$ at 85° C.

A pin-hole having a diameter of 0.1 mm was formed in the membrane whereby NaCl was contaminated at 2000 ppm in the catholyte of 14.4 N-NaOH in the electrolysis.

The pin-hole part of the membrane was dipped in a solution containing 1 vol. of acetic acid and 1 vol. of 2 N-HCl at 60° C. for 16 hours whereby the ion exchange groups of the membrane are converted to carboxylic acid groups and the pin-hole part of the membrane was heated at 190° C. under the pressure of 50 Kg/cm$^2$ for 5 minutes to melt the membrane whereby the pin-hole part was repaired.

The membrane was treated with NaOH aqueous solution to convert the ion exchange groups of the bonding part to the groups of sodium salt, and the membrane was used for the electrolysis of an aqueous solution of sodium chloride.

Thus, it was found that 14.4 N-NaOH aqueous solution was obtained from the cathode compartment under the cell voltage of 3.8 Volts in the current efficiency of 96% and the concentration of NaCl in the catholyte was only 20 ppm.

EXAMPLE 2

A hole having a diameter of 2 mm was formed on the cation exchange membrane (sodium salt type) of Example 1.

The membrane was treated in a methanol solution containing 5% of 12 N-HCl, at 60° C. for 15 hours whereby the ion exchange groups were converted to methyl ester groups.

Another disc shape membrane of the same methyl ester type fluorinated polymer having a thickness of 200μ and a diameter of 4 mm was put on the membrane at the hole having the diameter of 2 mm and the superposed membranes were heated at 200° C. under the pressure of 20 Kg/cm$^2$ for 5 min. to close the hole.

In accordance with the process of Example 1, the electrolysis of an aqueous solution of sodium chloride was carried out by using the repaired membrane. The concentration of NaCl in the catholyte was 20 ppm.

REFERENCE 1

A hole having a diameter of 2 mm was formed in the cation exchange membrane (sodium salt type) of Example 1.

Another disc shape membrane of the same sodium salt type fluorinated polymer having a thickness of 200μ and a diameter of 4 mm was put on the membrane at the hole having the diameter of 2 mm and the superposed membrane were heated at 200° C. under the pressure of 20 Kg/cm$^2$ for 5 min. to close the hole. However, the bonding was not sufficient so that the bonded disc was taken off easily.

EXAMPLE 3

Two sheets of membranes of a fluorinated polymer having the units

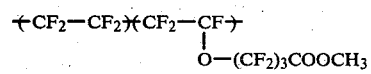

which had an ion exchange capacity of 1.50 meq/g polymer and T$_Q$ (temperature to give a volumetric melt flow rate of 100 m$^3$/sec.) of 230° C. and a thickness of 200μ (length of 50 cm and width of 10 cm) were bonded at three sides for each width of 5 mm by heating them in the commercial impulse heating apparatus under holding the bonding parts with fluoro-glass sheets (glass fiber cloth coated with a fluorinated polymer) at the temperature (lower surface) of 100° C. and the maximum temperature (upper surface) of 300° C. under the pressure of 5 Kg/cm$^2$ for 20 sec. whereby bag type bonded membranes were obtained.

In accordance with the process of Example 1, the bag type membranes were hydrolyzed in the presence of NaOH to form the bag type cation exchange membranes having the groups of sodium salt.

The bag type cation exchange membranes were covered on a finger type cathode made of iron and assembled with a finger type anode coated with ruthenium oxide with a space of the electrodes of 10 mm.

In accordance with the process of Example 1, the electrolysis of an aqueous solution of sodium chloride was carried out by using the electrolytic cell.

As the result, 14.4 N-NaOH aqueous solution was obtained from the cathode compartment under the cell voltage of 3.8 Volts in the current efficiency of 96%.

EXAMPLE 4

A cation exchange membrane of a fluorinated polymer having the units

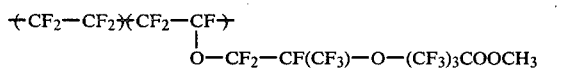

which had an ion exchange capacity of 0.95 meq/g polymer and $T_Q$ (temperature to give a volumetric melt flow rate of 100 mm$^3$/sec.) of 200° C. and a thickness of 200$\mu$ was bonded with the cation exchange membrane used in Example 3. Both of the membranes were superposed and heated at 250° C. under the pressure of 30 Kg/cm$^2$ for 5 minutes whereby they were completely bonded in one piece.

EXAMPLE 5

A 97.3 wt.% of a copolymer having the units

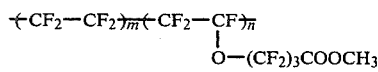

which had an ion exchange capacity of 1.50 meq/g polymer and $T_Q$ (temperature to give a volumetric melt flow rate of 100 mm$^3$/sec.) of 235° C. in a form of granule having a diameter of 0.5 mm was mixed with 2.7 wt.% of a polytetrafluoroethylene made by emulsion polymerization; 6J (manufactured by E. I. DuPont) and the mixture was kneaded by the two roll mill (rotating ratio of 1.2:1) heated at 135° C. for 10 minutes. The kneaded mixture was extruded by an extruder having a diameter of 40 mm to prepare a cation exchange membrane having a thickness of 250$\mu$ which was reinforced with fibrils of polytetrafluoroethylene.

Two sheets of the membranes (length of 50 cm and width of 20 cm) were bonded at three sides for each width of 5 mm by heating them in the commercial impulse heating apparatus under holding the bonding parts with fluoro-glass sheets (glass fiber cloth coated with a fluorinated resin) at the maximum temperature of 230° C. under the pressure of 6.6 kg/cm$^2$ for 20 sec. whereby bag type bonded membranes were obtained.

In accordance with the process of Example 1, the bag type membranes were hydrolyzed in the presence of NaOH to form the bag type cation exchange membranes having the groups of sodium salt.

The bag type cation exchange membranes were covered on a finger type cathode made of iron and assembled with a finger type anode coated with ruthenium oxide with a space of the electrodes of 10 mm.

In accordance with the process of Example 1, the electrolysis of an aqueous solution of sodium chloride was carried out by using the electrolytic cell.

As the result, 14.4 N-NaOH aqueous solution was obtained from the cathode compartment under the cell voltage of 3.8 Volts in the current efficiency of 96%.

What is claimed is:

1. In a method for melt bonding a cation exchange membrane, wherein the viscosity of the molten membrane is controlled to within the ring of 10$^2$ to 10$^6$ poise in order to affect bonding, which comprises a fluorinated copolymer containing (COO)$_m$X groups as the ion exchange groups, wherein X is an alkali metal, alkaline earth metal or NHR$_1$R$_2$R$_3$ wherein R$_1$, R$_2$ and R$_3$ represent hydrogen or a lower alkyl group and m is the valence of X, the improvement which comprises converting said (COO)$_m$X groups to —COOY groups prior to melt bonding, wherein Y represents a C$_1$–C$_{20}$ alkyl group.

2. The method of claim 1 wherein the bonding part of the membrane is melted under the pressure of 0.01 to 100 kg/cm$^2$ at the temperature higher than 100° C. and lower than a thermal decomposition temperature of the fluorinated polymer.

3. The method of claim 2 or 1 wherein the ion exchange capacity of the cation exchange membrane of the fluorinated polymer is in a range of 0.5 to 2.5 meq/g polymer.

4. The method of claim 2 or 1 wherein said fluorinated copolymer containing COOY groups has a volumetric flow rate of 100 mm$^3$/sec. in the range of 130° to 350° C.

5. The method of claim 2 or 1 wherein the fluorinated polymer has the units of (a) —(CF$_2$—CXX')— and (b) —(CF$_2$—CXY)— wherein X represents fluorine, chlorine, hydrogen or —CF$_3$; X' represents X or CF$_3$(CF$_2$)—$_m$; m represents 1 to 5; and Y represents —PA or —O—(CF$_2$)—$_m$(P,Q,R)-A, wherein P represents —(CF$_2$)—$_a$(CXX')$_b$—(CF$_2$)—$_c$; Q represents —(CF$_2$—O—CXX')—$_d$; R represents —(CXX'—O—CF$_2$)—$_e$; P, Q and R are arranged in optional order; X and X' are the same as defined above; n represents 0 or 1; a, b, c, d and e respectively represents 0 to 6; A represents —(COO)$_m$X or a functional group which can be converted to —(COO)$_m$X.

6. The method of claim 1 wherein the ion exchange group —(COO)$_m$X wherein X and m are defined above are converted to the group —COOY wherein Y is defined above by contacting the membrane with a C$_1$–C$_{20}$ alkohol in the presence of an acid or after treatment with an acid.

7. The method of claim 1 wherein the cation exchange membrane of a fluorinated copolymer is used in an electrolysis of an aqueous solution of alkali metal chloride to produce chlorine and an alkali metal hydroxide.

8. The method of claim 1 wherein a plurality of cation exchange membrane of the fluorinated polymer are melt-bonded to form a bag type membrane.

9. The method of claim 1 wherein the cation exchange membrane of the fluorinated polymer is melt-bonded with another synthetic resin which is meltable at the temperature for melting the fluorinated polymer.

* * * * *